United States Patent [19]

Aoki et al.

[11] 4,078,961
[45] Mar. 14, 1978

[54] APPARATUS FOR CONTINUOUSLY SUPPLYING PLASTICS FILM STRIP FROM EXTRUDED HEAD

[75] Inventors: Seiji Aoki; Akira Kamiyana, both of Koshigaya; Kokichi Matsuda, Kasukabe, all of Japan

[73] Assignee: Taiyo Shokai Co., Ltd., Japan

[21] Appl. No.: 734,395

[22] Filed: Oct. 21, 1976

Related U.S. Application Data

[62] Division of Ser. No. 520,214, Nov. 1, 1974, Pat. No. 4,007,078.

[30] Foreign Application Priority Data

Nov. 1, 1973 Japan .............................. 48-12217311
Nov. 7, 1973 Japan .............................. 48-124420

[51] Int. Cl.$^2$ .............................................. B29C 17/06
[52] U.S. Cl. .............................. 156/360; 93/DIG. 1; 156/159; 156/459; 156/466; 156/504; 156/244.16; 156/244.18; 226/110

[58] Field of Search ............... 156/157, 158, 159, 184, 156/191, 244, 267, 270, 324, 353, 360, 459, 466, 494, 495, 500, 502, 504, 507, 512, 543, 544; 93/DIG. 1; 226/109, 110; 264/96, 176 R, 209; 425/66

[56] References Cited

U.S. PATENT DOCUMENTS

| 3,533,884 | 10/1970 | Quackenbush | 156/244 |
| 3,562,045 | 2/1971 | Hasegawa | 156/159 |
| 3,678,545 | 7/1972 | Hino et al. | 425/66 |
| 3,769,124 | 10/1973 | Johnson | 156/159 |
| 3,799,826 | 3/1974 | Kron | 156/159 |
| 3,848,035 | 11/1974 | Behr | 264/209 |

*Primary Examiner*—William A. Powell
*Assistant Examiner*—John E. Kittle
*Attorney, Agent, or Firm*—McGlew and Tuttle

[57] ABSTRACT

A film strip of a thermoplastic synthetic resin, as a bag or package material, is continuously supplied, from an extruder to a printing machine, bag-making machine, packaging machine or like machine. In the apparatus, the material film strip supplied from the extruder at the initial stage of operation thereof, is first led to and wound by a winder, and then fed to such machine. A switching mechanism is provided for shifting the strip from one travel course to another.

2 Claims, 5 Drawing Figures

APPARATUS FOR CONTINUOUSLY SUPPLYING PLASTICS FILM STRIP FROM EXTRUDED HEAD

CROSS-REFERENCE TO RELATED APPLICATION

This application is a division of application Ser. No. 520,214 filed Nov. 1, 1974, and now U.S. Pat. No. 4,007,078, issued Feb. 8, 1977.

BACKGROUND OF THE INVENTION

1. Field of the Invention

This invention relates to apparatus for continuously supplying a film strip of a thermoplastic synthetic resin, such as a vinyl or polyethylene resin, as a bag or package material, which is extruded from an extruder head, to a printing machine, bag making machine, packaging machine or like machine.

2. Description of the Prior Art

In general, in conventional machines in the art, such material film strip which is extruded from the extruder head having a rectilinear orifice or an annular orifice, is first wound around a supply reel or roll, and then the strip is supplied from such supply roll to a machine such as a bag making machine. With such a way of supply or feed of the material film strip to such machine, it is required necessary to repeat the loading of a new supply roll every 15-20 minutes because, in general, a roll of such strip or web is 1000-1500 m at most in length. Such frequent loading of a new roll is not only troublesome, but also consumes a considerable time and labor. Further, it is necessary to stop operation of the machine each time when a new supply roll is loaded. Consequently, the working efficiency of the machine is decreased, causing the cost of products to be expensive.

The foregoing inconveniences and disadvantages of such prior art can be overcome by providing an apparatus which makes it possible to continuously supply a film strip of a thermoplastic synthetic resin to a machine from an extruder head which continuously extrudes a single film strip or a tube which is subsequently formed into a film strip in the form of a collapsed tube.

At the initial stage of operation of the extruder, however, the film strip extruded from the extruder head does not have a regular thickness and breadth which are predetermined and is not suitable for a bag material or a packaging material to be fed to a bag-making machine or a packaging machine. In other words, the film strip formed at the initial stage of operation of the extruder is so irregular in thickness and breadth that it is unsuitable for use as a material for a bag or package which requires precise dimensions. Thus, there arises a problem of how such a defective film strip should be dealt with. If the strip is fed to such machine, products which are difficult to reproduce and which require expense for the disposal thereof are continuously manufactured. To avoid such waste of material, it is necessary to delay feeding the film strip to such machine until the film strip being extruded from the extruder head is formed to have a predetermined regular or uniform thickness and breadth.

SUMMARY OF THE INVENTION

In accordance with the present invention, the aforementioned problem is solved by providing devices in which the film strip is guided and transferred to means located at a position separate from a machine by which the strip is processed, such as a bag-making machine.

There is provided, by the present invention, an apparatus for continuously supplying a material film strip of a thermoplastic synthetic resin, which is extruded from an extruder head, to a printing machine, bag-making machine, packaging machine or like machine, characterized in that a switching mechanism, for shifting the film strip from one travel course to another, is provided between the extruder and such machine, the two travel courses leading to a winding means and to the machine, respectively, the switching mechanism being formed with first and second passages for the strip which are directed respectively toward the winding means and toward the machine, that the winding means is located at a position separate from the machine, the winding means being adapted to wind up the strip until it is formed to have a regular thickness and breadth, that a means for cutting the strip is provided on the material-feeding side of the switching mechanism to cut the strip when it is switched, and that a means for pulling the strip toward the machine is provided, the pulling means being mounted thereon.

BRIEF DESCRIPTION OF THE DRAWINGS

The apparatus of the present invention is shown by way of example in the attached drawings in which.

DESCRIPTION OF THE PREFERRED EMBODIMENT

Figure 1:
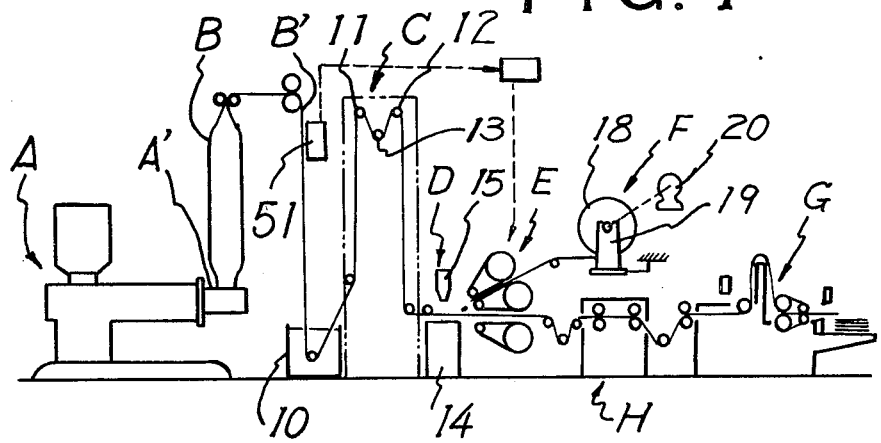
FIG. 1 is a diagrammatic side view of one embodiment of the apparatus.
Figure 2:
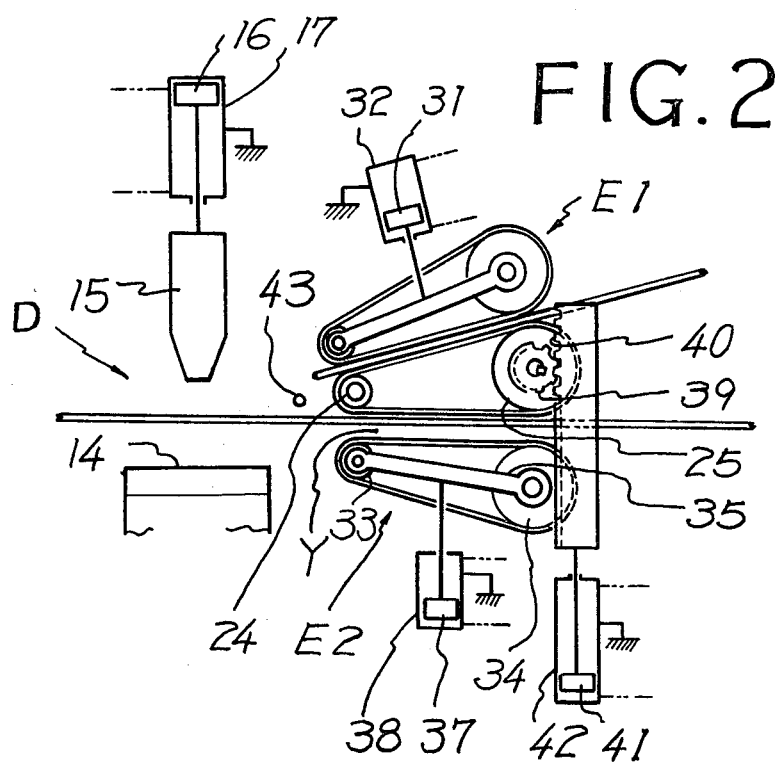
FIG. 2 is a schematic side view of a switching mechanism incorporated in the apparatus.

Like portions or parts are indicated by like numerals and characters throughout the specification and drawings.

In the embodiment illustrated in the drawings, A indicates an extruder having a head A' from which an inflatable tube B of a thermoplastic synthetic resin, such as polyethylene, as a bag material, is continuously extruded through a circular orifice or ring nozzle thereof. The tube B is collapsed and shaped, by a series of roller means, into a film strip B', as a bag material, after being inflated by blowing. 10 indicates a water reservoir for cooling the strip B'.

Indicated by C is a strip-tensioning means composed of two guide rollers 11, 12 rotatably supported above a frame structure, not shown, and a vertically displaceable roller 13 which is carried by the film strip B'. D is a heat-sealing device which comprises a fixed table 14 and a heat-sealer 15 which is arranged to move toward and away from the table by means of a piston 16 which reciprocates in an air cylinder 17 fixed to the frame structure.

E indicates a switching mechanism for shifting the film strip B' from one travel course to another. As will become apparent from the following explanation, one of the two travel courses leads to a winding device F and the other of the two leads to a bag-making machine G through a printing machine H which is combined therewith. The winding device F comprises a winding reel or drum 18, rotatably supported by a fixed support 19 which is located at a position separate from the bag-making machine G, and a torque motor 20 for driving the drum 18 to wind up the film strip B' which is supplied from the extruder head A' at the initial stage of operation of the extruder A.

The switching mechanism E comprises two conveyor means E1 and E2 of a nipper type. The first conveyor means E1 is composed of a common conveyor assembly 21, which is common to the second conveyor means E2, and an upper conveyor assembly 22 located on the upper the of said common conveyor assembly, so that, between the two assemblies 21 and 22, there is formed a first passage X for the film strip B' that is directed toward the winding device F. The second conveyor means E2 is composed of the common conveyor assembly 21 and a lower conveyor assembly 23 located on the lower side thereof, so that between the two assemblies 21 and 23 is formed a second passage Y for the film strip B' that is directed toward the machine G.

Figure 5:
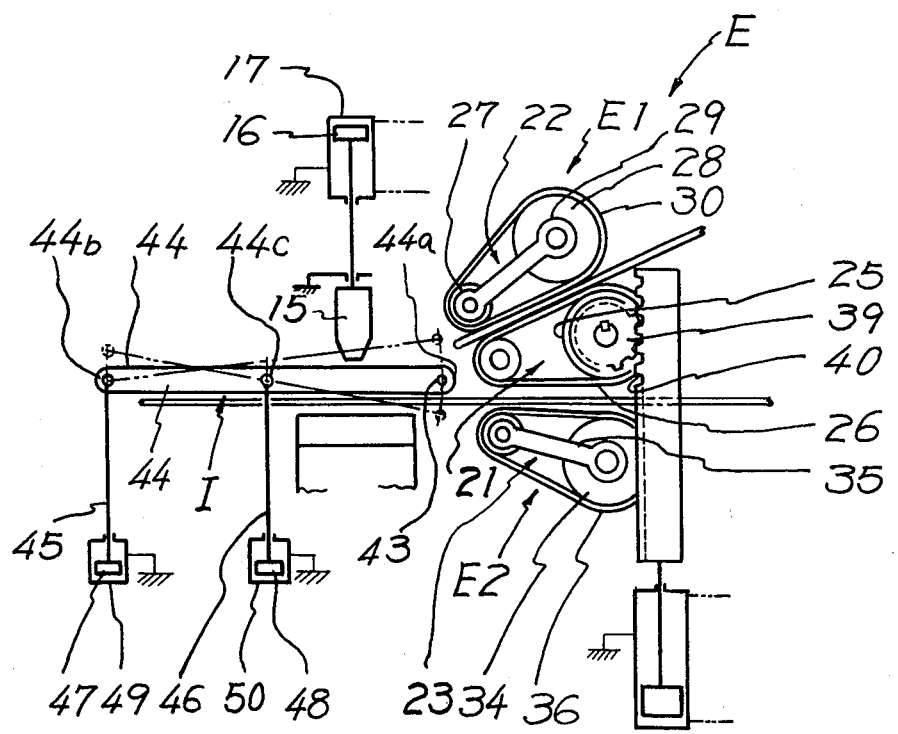
FIG. 5 is a schematic side view of the switching mechanism with a heat-cutting device, showing the manner in which the heat-cutting device is operated.

The common conveyor assembly 21 is composed of a pair of rollers 24 and 25 rotatably supported by bearings secured to a fixed frame, not shown, and an endless belt 26 passing over the rollers 24 and 25. The upper conveyor assembly 22 comprises a pair of rollers 27 and 28 (FIG. 5) rotatably supported by a bearing means 29, which is slidably mounted on the frame, and an endless belt 30 passing over the rollers 27 and 28.

To the bearing means 29, there is connected a piston 31 of an air cylinder 32 fixed to the frame so that the upper conveyor assembly 22 can be pneumatically moved toward and away from the common conveyor assembly 21 whereby the film strip B' which is passed through the first passage X between the two assemblies 21 and 22 can be pinched by and released from the two.

The lower conveyor assembly 23 also has a pair of rollers 33 and 34, a bearing means 35, an endless belt 36, a piston 37 and an air cylinder 38 which are the same as those of the upper conveyor assembly 22 in structure and function, so that the film strip B' which is passed through the second passage Y between the common conveyor assembly 21 and the lower conveyor assembly 23 can be pinched by and released from the two assemblies.

Mounted coaxially with roller 25 of the common conveyor assembly 21, there is a gear 39 which is in meshed engagement with a rack 40 which is connected to a piston 41 of an air cylinder 42 secured to the frame, whereby, when the rack 40 is pneumatically reciprocated, the gear 39 is rotated clockwise or counter-clockwise within a stroke of the rack, causing the conveyor belt 26 of the assembly 21 to rotate clockwise or counter-clockwise.

Indicated by I (FIG. 5) is a heat-cutting device which comprises a heat-cutting wire 43 extending transversely across the longitudinal axis of a travel path of the film strip B' at a position between the heat-sealing device D and the switching device E and rigidly supported by a pair of levers 44 at tip portions 44a thereof. To the base portion 44b and the intermediate portion 44c of each lever 44 there are respectively pivoted first ends of piston rods 45 and 46, the other ends of which are connected to pistons 47 and 48 of respective vertical air cylinders 49 and 50 which are secured to the frame. When both pistons 47 and 48 assume the lowermost positions, the levers 44 are held in substantially horizontal positions so that the transversely extending wire 43 can assume a neutral position which is slightly above a horizontal path of travel of the film strip B' that leads to the machine G through the second passage Y between the common conveyor assembly 21 and the lower conveyor assembly 23.

As the pistons 47 are moved upwardly, the tip portions 44a of the levers 44 are lowered, together with the cutting wire 43, since the levers are swung clockwise about the intermediate pivot 44c, whereby the film strip B', extending between extruder head A' and the machine G through the second passage Y, can be heat-cut by the wire 43. On the other hand, as the pistons 48 are moved upwardly, the levers 44 are swung counter-clockwise about the other pivot 44b and the tip portions 44a are moved upwardly together with the wire 43, whereby the strip B', extending between the extruder head A' and the winder F through the first passage X, can be heat-cut by the wire 43.

Numeral 51 (FIG. 1) indicates a detector means for detecting the thickness and the breadth of the film strip B' continuously supplied from the extruder head A'. If and when it is detected by the detector means that the thickness and the breadth of the strip do not conform to requirements, a signal thereof is transmitted to a control means so that the switching operation can be actuated.

When it is desired to operate the foregoing apparatus, the film strip B', which is continuously supplied from extruder head A' by way of a series of roller means and the strip-tensioning means C, is fed to pass over the fixed table 14 of heat-sealing device D and therefrom to pass above the heat-cutting wire 43, and then it is passed through the first passage X between the two conveyor assemblies 21 and 22 and is secured to the winding drum 18. Thereafter, the winding device F is operated to wind up the strip B' until it is formed to have a predetermined regular thickness and breadth. After the strip has attained such thickness and breadth, the operation of device F is stopped and the switching mechanism E is actuated in the following manner.

First, the upper conveyor assembly 22 is moved toward the common conveyor assembly 21 by pneumatically actuating the piston 31 of air cylinder 32 to pinch the film strip B' between the two assemblies 21 and 22. Second, the strip B' is cut by the heat-cutting wire 43 of heat-cutting device I on the material-feeding side of the switching mechanism E in such a way that the levers 44 are swung counter-clockwise about the pivot 44b by moving the piston 48 of air cylinder 50 upwardly with air pressure to move the tip portions 44a upwardly together with the wire 43. Third, the strip B' thus cut is fed to the machine G after being passed through the second passage Y between the common conveyor assembly 21 and the lower conveyor assembly 23.

Figure 3:
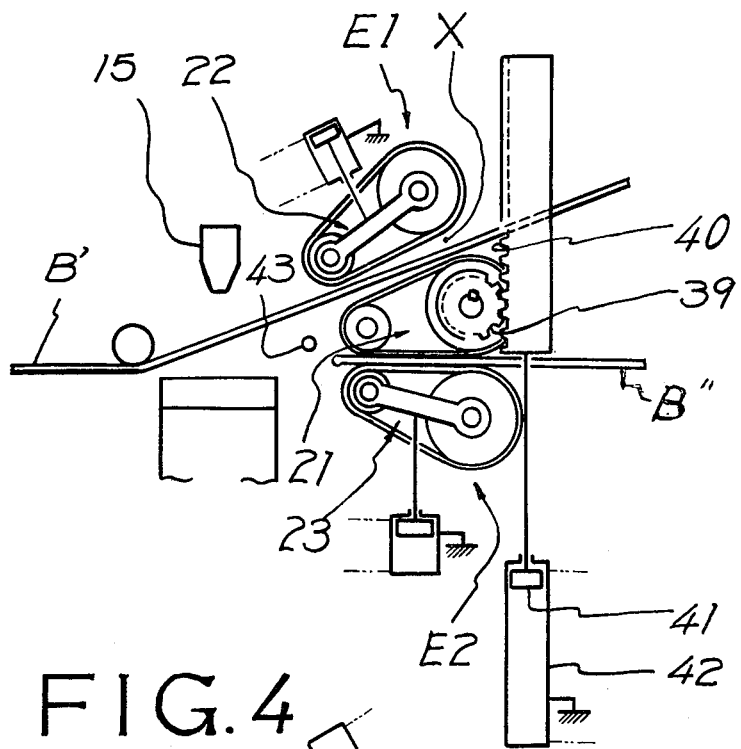
FIG. 3 is a view similar to FIG. 2, showing the manner in which the rearward end of a film strip loaded on a machine is reversed by the switching mechanism so as to be connected to a film strip extending from an extruder head to a winding device.

However, if and when a coupling film strip B'', having a quality identical or similar to that of the film strip B' is loaded beforehand on the machine and the rearward end thereof is passed through the second passage Y as shown in FIG. 3, the aforementioned second and third steps can be replaced by the following steps.

(a) The rack 40 is moved downwardly by moving the piston 41 of cylinder 42 downwardly with air pressure to impart clockwise rotation to the roller 25 with the gear wheel 39 in engagement with rack 40, to thereby drive the belt 26 for rotation in the clockwise direction, causing the coupling film strip B" pinched between the two assemblies 21 and 23 to be reversed toward the heat-sealing device D. (b). After the rearward end of the coupling strip B" has met the film strip B' under the heat-sealer 15, namely, between the table 14 and the heat-sealer 15, this heat-sealer 15 is moved downwardly by moving the piston 16 of cylinder 17 downwardly with air pressure to press the two overlapped strips B' and B" against the surface of table 14, thereby heat-sealing the strips to each other. After the two strips have thus been heat-sealed, the heat-sealer 15 is pneumatically returned to the original position. (c). The strip B' is cut in the same manner as in the aforementioned second step. (d). The lower conveyor assembly 23 is moved away from the middle conveyor assembly 21 by pneumatically depressing the piston 37 of cylinder 38 so that the film strip B', coupled with the strip B" and continuously supplied from extruder head A', can be fed to the machine G through the second passage Y.

If the machine G is actuated after such a series of steps have been taken, the film strip B' can be continuously supplied to the machine by being pulled by the pulling means mounted thereon, such as drag pinch rolls or conveyor means of a nipper type, as long as the extruder A is kept operating.

Next, if operation of both the extruder A and the machine G is once stopped and should be resumed after a while, the following steps are to be taken.

Figure 4:
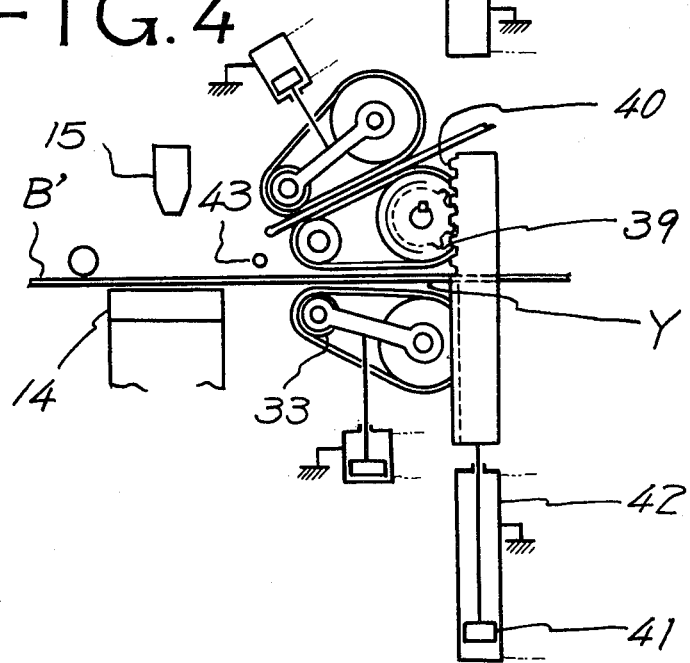
FIG. 4 is a view similar to FIG. 2, illustrating the manner in which the rearward end of a film strip extending from the winding device is reversed so as to be connected to a film strip extending from the extruder head to the machine.

(1). The film strip B', extending from the winding device F and pinched between common conveyor assembly 21 and upper conveyor assembly 22 as shown in FIG. 4, is reversed, by rotating the belt 26 of assembly 21 in counter-clockwise direction by driving upwardly the rack 40 which is engaged with the gear wheel 39 of roller 25 by moving the piston 41 upwardly with air pressure, until the rearward end of the strip meets the other strip, which extends from extruder a to machine G, under the heat-sealer 15. (2). The two strips B' and B' overlapped under the heat-sealer 15 are connected together by heat-sealing in the manner aforementioned. (3). The film strip B' passing through the second passage Y is cut by the heat-cutting wire 43 on the material-feeding side of the switching mechanism E by swinging the levers 44 clockwise about the pivot 44c by moving upwardly the piston 47 of cylinder 49 with air pressure to move downwardly the tip portions 44a together with the wire 43. (4). The strip B' passing through the first passage X is wound up by the winding device F until the strip supplied from the extruder head A' attains a predetermined thickness and breadth. (5). After the strip has attained such thickness and breadth, the operation of device F is stopped and the switching mechanism E is actuated in the manner aforementioned.

In the illustrated embodiment, each of the air cylinders 17, 32, 38, 42, 49, 50, in which the mating pistons are reciprocated by air under pressure, is connected to a pneumatic system, not shown, which comprises air supply lines, an air tank, an air pump, a motor and electromagnetic valves which are arranged to be operated for delivering air under pressure selectively to the ends of the respective air cylinders.

It is to be noted in this connection, however, that, in lieu of such pneumatic system, an appropriate hydraulic system may be employed and that, in either case, a sequential control system can be employed.

It is to be understood also that various modifications and changes may be made in the structural details of the apparatus, within the scope of the following claims, without departing from the spirit of the invention.

What we claim is:

1. In apparatus for continuously supplying a film strip of a thermoplastic synthetic resin from an extruder, forming the strip, to a processing machine, such as a printing machine, bag-making machine, the improvement comprising, in combination, a strip winding means spaced apart from said processing machine; a switching mechanism positioned between said extruder and said machine for shifting the film strip between a first travel course leading to said winding means and a second travel course leading to said processing machine; said switching mechanism defining a first passage, for imperfect film strip, directed toward said winding means and a second passage, for perfect film strip, directed toward said processing machine; said switching mechanism leading a film strip, supplied from the extruder during initial operation thereof and lacking a predetermined regular thickness and breadth, along said first passage for imperfect film strip for winding by said winding means until the wound extruded film strip has such predetermined regular thickness and breadth; means, including a detector means for detecting the thickness and breadth of the film strip supplied from the extruder, operable, responsive to detection of the film strip having such predetermined regular thickness and breadth, to interrupt the winding operation of said winding means; strip cutting means on the material-feeding side of said switching mechanism operable to cut the film strip when the latter is to be switched between said first and second passages; said switching means, responsive to interruption of the operation of said winding means and operation of said cutting means, leading the film strip supplied from the extruder along said second passage for perfect film strip directed toward said processing machine; a strip pulling means mounted on said processing machine and operable to pull the film strip, having such predetermined regular thickness and breadth, toward said processing machine; a heat-sealing device located on the material-feeding side of said switching mechanism; said heat-sealing device comprising a fixed table and a heat-sealer mounted for movement toward and away from said table and adapted to connect the leading end of the film strip continuously supplied from the extruder and severed from a preceding portion of the film strip by said cutting means, to the trailing end of a heat-weldable coupling film strip previously supplied to said processing machine along said second perfect film strip passage and having such predetermined regular thickness and breadth; said switching mechanism comprising first and second reversible conveyor means of a nipper type; said first conveyor means being constituted by a common conveyor assembly, common to said second conveyor means, and an upper conveyor assembly located on the upper side of said common conveyor assembly and mounted for mvoement toward and away from said common conveyor assembly; said second conveyor means being constituted by said common conveyor assembly and a lower conveyor assembly located on the lower side of said common conveyor means and mounted for movement toward and away from said common conveyor assembly; and respective means selectively operable to move siad upper conveyor assembly and said lower conveyor assembly toward and away from said common conveyor assembly; said first conveyor means defining said first passage for imperfect film strip directed toward said winding means, and said second conveyor means defining said second perfect film strip passage directed toward said processing machine.

2. In apparatus for continuously supplying a film strip of a thermoplastic synthetic resin from an extruder, the improvement claimed in claim 1, including means selectively operable to rotate said common conveyor assembly in opposite angular directions so that said upper and lower conveyor assemblies are respectively rotated in opposite angular directions; whereby the film strip nipped by either said first conveyor means or said second conveyor means can be moved reversely toward said heat-sealing device.

* * * * *